US012681160B2

(12) United States Patent
Cornic et al.

(10) Patent No.: US 12,681,160 B2
(45) Date of Patent: Jul. 14, 2026

(54) DOPPLER RADAR WITH AMBIGUOUS ELECTRONIC SCANNING

(71) Applicant: THALES, Courbevoie (FR)

(72) Inventors: Pascal Cornic, Brest (FR); Yves Audic, Brest (FR); Renan Le Gall, Brest (FR); Yoan Veyrac, Brest (FR)

(73) Assignee: THALES, Courbevoie (FR)

( * ) Notice: Subject to any disclaimer, the term of this patent is extended or adjusted under 35 U.S.C. 154(b) by 363 days.

(21) Appl. No.: 18/247,868

(22) PCT Filed: Sep. 14, 2021

(86) PCT No.: PCT/EP2021/075204
§ 371 (c)(1),
(2) Date: Apr. 4, 2023

(87) PCT Pub. No.: WO2022/073727
PCT Pub. Date: Apr. 14, 2022

(65) Prior Publication Data
US 2023/0417893 A1     Dec. 28, 2023

(30) Foreign Application Priority Data
Oct. 8, 2020     (FR) ...................................... 2010279

(51) Int. Cl.
*G01S 13/42* (2006.01)
*G01S 13/02* (2006.01)

(52) U.S. Cl.
CPC ..... *G01S 13/426* (2013.01); *G01S 2013/0254* (2013.01)

(58) Field of Classification Search
CPC ........... G01S 13/426; G01S 2013/0254; G01S 13/89; G01S 13/913; G01S 13/931; G01S 2013/93271
See application file for complete search history.

(56) References Cited

U.S. PATENT DOCUMENTS

| | | | |
|---|---|---|---|
| 3,268,890 A | 8/1966 | Warren | |
| 11,415,664 B2 * | 8/2022 | Hammes | G01S 13/931 |
| 12,140,692 B2 * | 11/2024 | Maruyama | H01Q 21/06 |

FOREIGN PATENT DOCUMENTS

| | | |
|---|---|---|
| EP | 0568427 A1 | 11/1993 |
| FR | 3101431 A1 | 4/2021 |

(Continued)

OTHER PUBLICATIONS

JP2005195491A_Description_20250424_1406.pdf—translation of JP2005195491A (Year: 2005).*

(Continued)

*Primary Examiner* — Yonghong Li
(74) *Attorney, Agent, or Firm* — Conley Rose, P.C.

(57)     ABSTRACT

A Doppler radar with ambiguous electronic scanning, using an active antenna comprising an array of elementary transmission antennas and an array of elementary reception antennas with the same angular opening. The arrays have the same radiation plane. The transmission array is ambiguous with a number of ambiguous lobes within said angular opening of said elementary antennas greater than or equal to 2. The reception array comprises at least one ambiguous lobe within said angular opening. The arrays are arranged so that the product of the transmission and reception radiating patterns only produces a single main beam within the field defined by said angular opening. The coverage of said angular field by said radar obtainable by:
forming at the transmission antenna radiating patterns that are focused within a field limited to the transmission ambiguity field;
simultaneously forming several reception radiating patterns focused at reception in the ambiguous transmission directions.

9 Claims, 12 Drawing Sheets

(56)                    References Cited

FOREIGN PATENT DOCUMENTS

| FR | 3109825 | A1 | | 11/2021 |
|----|---------|----|----|---------|
| JP | 2005195490 | A | * | 7/2005 |
| JP | 2005195491 | A | * | 7/2005 |
| WO | 2020070735 | A1 | | 4/2020 |
| WO | 2022073727 | A1 | | 4/2022 |

OTHER PUBLICATIONS

JP2005195490A_Description_20250424_1527.pdf—translation of JP2005195490A (Year: 2005).*

Cancrinus_Master_thesis_Grating_Lobe_Selection_Scheme.pdf (Year: 2019).*

Foreign Communication from a Related Counterpart Application, International Search Report and Written Opinion with Translation dated Dec. 22, 2021, International Application No. PCT/EP2021/075204 filed on Sep. 14, 2021.

Leif C. Stange, et al., "Reducing Cross-Target Products in Thinned Antenna Arrays using Nonlinear Processing", Microwave Conference, 2002. 32nd European, IEEE, Piscataway, NJ, USA, Sep. 23, 2002 (Sep. 23, 2002), pp. 1-4, XP031606289.

* cited by examiner

DOPPLER RADAR WITH AMBIGUOUS ELECTRONIC SCANNING

CROSS-REFERENCE TO RELATED APPLICATIONS

The present application is a filing under 35 U.S.C. 371 as the National Stage of International Application No. PCT/EP2021/075204, filed Sep. 14, 2021, entitled "DOPPLER RADAR WITH AMBIGUOUS ELECTRONIC SCANNING," which claims priority to French Application No. 2010279 filed with the Intellectual Property Office of France on Oct. 8, 2020, both of which are incorporated herein by reference in their entirety for all purposes.

The invention relates to the field of active antenna radar systems, and more particularly radar systems designed to cover a given solid angle with a high angular discrimination. The invention is notably applicable for Doppler radar systems on moving platforms, for example radar systems allowing the visualization of runways on a commercial aircraft, performing a function of EVS (acronym for Enhanced Vision System) or else automobile radar systems for anti-collision or imaging functions designed for autonomous vehicles.

One problem to be addressed is to display a virtually instantaneous image with high angular resolution of the scene present in the whole of the field of view of a radar, while at the same time limiting the digital processing requirements to enable this function and while reducing the complexity and the cost of such a radar. This capacity is particularly advantageous on a carrier which is moving at a high speed with respect to the scene to be observed, or when the scene is itself rapidly changing, or even when these two conditions occur simultaneously.

In such cases, the refreshment time must be reduced which requires the number of orientation directions of the antenna to be reduced in order to cover the whole of the angular field. In practice, the angular field to be processed is often very wide, typically several tens of degrees, whereas the focusing requirement imposes a narrow elementary beam, typically with a width of less than one degree, which increases the difficulty of defining a solution that is both simple and effective.

In the prior art, in order to achieve the desired result, the conventional solutions of the mechanical scanning type implementing a narrow beam for scanning the field of observation are not suitable because of the cycle time needed in order to refresh the information. Moreover, this type of solution often presents a lack of reliability over time, in particular when the scanning speed needs to be high.

A second very common type of radar is based on antennas using electronic scanning, in one or two dimensions. These antennas require a large number of phase-controlled radiating elements in order to produce both a good resolution and a wide angular coverage. Unfortunately, these solutions are often very expensive and maladapted for applications requiring moderate costs.

The solutions based on beam formation by computation, implementing a transmission by a single wide-field antenna and a multichannel array antenna in reception, allow an instantaneous observation of the angular field but suffer from a low discrimination, due to the lack of selectivity of the transmission antenna, and are likely to need a high power emitter in view of the low antenna gain at the transmission.

Other solutions, of the type "with multiple inputs and outputs" referred to as MIMO (acronym for Multiple Input Multiple Output), associating several transmission channels and several reception channels, are possible. In this case, there are N transmission channels and M reception channels, and the elementary transmission power can remain modest. However, the radar processing must be applied to all of these N×M channels, which may entail an extremely high processing load, in particular for a real-time application. This processing load is all the higher the larger the number of orientation directions of the beam. This may be out of reach for reasons of cost, of integration and of power consumption.

The patent application FR1910613 discloses a solution based on a radar with active antenna in which a focusing of the transmission antenna is carried out in a different direction from transmission pulse to pulse with a formation of at least one reception beam in the direction of focusing of the transmission for each pulse emitted. This solution allows, at the same time, a virtually instantaneous image of the scene of observation to be produced, the angular discrimination objective to be achieved and the processing load to be very significantly reduced with respect to a solution based on MIMO processing. It is applicable to an antenna with a conventional AESA (acronym for Active Electronically Scanned Array) architecture or MIMO. It may be implemented using a low power technology at the transmission and standard electronic components.

The patent application FR2004262, which is based on the same principles, provides an alternative which allows, as a complement, the speed of the targets to be determined when the radar is ambiguous in Doppler mode.

In order to reduce the cost and the complexity, these solutions according to the prior art are preferably implemented by means of thinned antenna arrays exhibiting ambiguities. This may decrease the observable angular field or may necessitate complex processing operations in order to remove these ambiguities. Furthermore, the refreshment time of the data and the processing load may be significant owing to the large number of different angular orientations needed for the transmission to cover the whole of the angular field with a low-divergence focused beam.

One aim of the invention is notably to overcome these drawbacks of the prior art and to solve the aforementioned technical problem. For this purpose, the subject of the invention is a radar with ambiguous electronic scanning allowing a given angular field to be covered. The electronic scanning radar comprises an active antenna comprising an array of elementary transmission antennas and an array of elementary reception antennas with the same angular opening, said transmission and reception arrays having the same radiation plane, in which:

said transmission array is ambiguous with a number $N_{ambTX}$ of ambiguous lobes within said angular opening of said elementary antennas, $N_{ambTX}$ being greater than or equal to 2;

said reception array comprises at least one ambiguous lobe within said angular opening, said transmission and reception arrays being arranged so that the product of the transmission and reception radiating patterns only produces a single main beam within the field defined by said angular opening.

This configuration allows the coverage of said given angular field by said radar to be obtained in the following manner:

by forming at the transmission antenna radiating patterns that are focused within a field limited to the transmission ambiguity field;

by simultaneously forming several reception radiating patterns focused at reception in the ambiguous transmission directions.

Advantageously, the radar is configured for covering the given angular field:

by forming at the transmission antenna radiating patterns that are focused within a field limited to the transmission ambiguity field;

by simultaneously forming several reception radiating patterns focused at reception in the ambiguous transmission directions.

In other words, the angular coverage of the given angular field by the radar is obtained:

by forming at the transmission antenna radiating patterns that are focused within a field limited to the transmission ambiguity field;

by simultaneously forming several reception radiating patterns focused at reception in the ambiguous transmission directions.

In one particular embodiment:

said transmission array comprises a number $N_{TX}$ of elementary antennas with angular opening $\Delta\theta$, regularly spaced out by a distance $L_{TX}$, producing an ambiguous angular radiating pattern of angular periodicity in $\theta$ such that $\sin\theta$ is equal to $\lambda/L_{TX}$, $\lambda$ being the wavelength of said radar;

said reception array comprises a number $N_{RX}$ of elementary antennas (of angular opening $\Delta\theta$, regularly spaced out by a distance $L_{RX}$, producing a potentially ambiguous angular radiating pattern of angular periodicity in $\theta$ such that $\sin\theta$ is equal to $\lambda/L_{RX}$;

the ambiguity periods $\lambda/L_{TX}$ and $\lambda/L_{RX}$, respectively of the transmission and of the reception arrays, being chosen to be different from one another, and in such a manner that, for any given pair of transmission and reception orientation directions, there is no more than one coincidence possible of the ambiguous transmission and reception directions within said angular field.

Advantageously, the coverage of said given angular field is obtained:

by moving by electronic scanning the main direction of the beam focused by the all of the $N_{TX}$ transmission antennas into the field of ambiguity defined by sin $\theta=\lambda/L_{TX}$;

for each orientation direction of the transmission, using beam formation by computation based on the signals collected on the $N_{RX}$ reception antennas, by generating a set of beams focused in the main direction and each of the ambiguous directions formed by the transmission array.

Advantageously, the radar is configured for covering the angular field in the manner described in the preceding paragraph.

Advantageously, residual ambiguity lobes are rejected by Doppler filtering.

Advantageously, residual ambiguity lobes are rejected by selectivity in distance.

In one embodiment, said active antenna is of the type active array with electronic scanning.

In another embodiment, said active antenna is of the type with multiple inputs and outputs.

The invention also relates to a method of electronic scanning of a given angular field using a radar with ambiguous electronic scanning according to the invention. In the method according to the invention, the given angular field is covered:

by forming at the transmission antenna radiating patterns that are focused within a field limited to the transmission ambiguity field, by simultaneously forming several reception radiating patterns focused at reception in the ambiguous transmission directions.

Advantageously, the radar used has the following features:

said transmission array comprises a number NTX of elementary antennas of angular opening $\Delta\theta$, regularly spaced out by a distance LTX, producing an ambiguous angular radiating pattern of angular periodicity in $\theta$ such that $\sin\theta$ is equal to $\lambda/$LTX, $\lambda$ being the wavelength of said radar;

said reception array comprises a number NRX of elementary antennas of angular opening $\Delta\theta$, regularly spaced out by a distance LRX, producing a potentially ambiguous angular radiating pattern of angular periodicity in $\theta$ such that $\sin\theta$ is equal to $\lambda/$LRX;

the ambiguity periods $\lambda/$LTX and $\lambda/L_{RX}$, respectively of the transmission and of the reception arrays, being chosen to be different from one another and in such a manner that, for any given pair of transmission and of reception orientation directions, there is no more than one possible coincidence of the ambiguous transmission and reception directions within said angular field.

In the method, the given angular field is advantageously covered:

by moving by electronic scanning the main direction of the beam focused by all of the NTX transmission antennas within the field of ambiguity defined by sin $\theta=\lambda/$LTX;

for each orientation direction of the transmission, using beam formation by computation based on the signals collected on the NRX reception antennas, by generating a set of beams focused in the main direction and each of the ambiguous directions formed by the transmission array.

Advantageously, residual ambiguity lobes are rejected by Doppler filtering.

Advantageously, residual ambiguity lobes are rejected by selectivity in distance.

Other features and advantages of the invention will become apparent with the aid of the description that follows, presented with regard to the appended drawings which show:

FIG. 1, an illustration of the principle of operation of an antenna of the AESA type;

FIG. 2, an illustration of the principle of operation of an antenna of the MIMO type;

FIG. 3, one example of array antenna used for the implementation of the invention;

FIG. 4, an illustration of the transmission and reception radiating patterns of the aforementioned antenna oriented in the direction 0°;

FIG. 5, an illustration of the product of the transmission and reception radiating patterns oriented in the direction 0°;

FIG. 6A, an illustration of the product of the transmission radiating pattern oriented in the direction 0° and of the reception radiating pattern oriented in the direction −2°;

FIG. 6B, an illustration of the product of the transmission radiating pattern oriented in the direction 0° and of the reception radiating pattern oriented in the direction +2°;

FIG. 7, a representation of the transmission radiating pattern oriented in the direction +5.7°;

FIG. 8, an illustration of the product of the transmission radiating pattern and of the reception radiating pattern oriented in the direction +5.7°;

FIG. 9, an illustration of the product of the transmission radiating pattern oriented in the direction 5.7° and of the reception radiating pattern oriented in the direction 0°;

FIG. 10, an illustration of the product of the transmission radiating pattern oriented in the direction +5.7° and of the reception radiating pattern oriented in the direction −5.7°;

FIG. 11, another example of an array antenna used for the implementation of the invention.

A radar system according to the invention is based on an active antenna architecture, which may be an antenna with conventional electronic scanning of the AESA (Active Electronically Scanned Array) type or an antenna of the MIMO type. FIGS. 1 and 2 recall, with simplified representations, the structure of an AESA antenna and of a MIMO antenna, respectively.

In the AESA structure illustrated in FIG. 1, each transmitting and receiving radiating element 1 is connected to a microwave module 2 which implements both the transmission 23 and the reception 24 by switching 21, 22. The microwave modules will be henceforth referred to as TR modules (transmission and reception modules). In order to perform the aforementioned functions, a TR module comprises power amplification means 23 (HPA), low-noise amplification means 24 in reception (LNA). It also comprises phase-shifters 25, 26 for phase-shifting the transmission signal and for phase-shifting the reception signal on each elementary channel. The phase-shifters are controlled by digital control means not shown. The TR modules 2 are connected to a transmission and reception assembly 10 notably comprising the wave generation and the analog-digital conversion circuits. The digital controls of the phase-shifters may be situated within the assembly 10.

In the MIMO structure illustrated in FIG. 2, the transmission radiating elements 1' are separated from the reception radiating elements 1" in contrast to the AESA case where the same radiating element is used in transmission and in reception. A transmission radiating element 1' and a reception element 1" are therefore respectively associated with a transmission module 2' and with a reception module of 2". Each transmission module 2' comprises a power amplifier 23' and a phase-shifter 25'. Each reception module 2" comprises a low-noise amplifier 24" and a phase-shifter 26". The phase-shift in reception is, preferably, implemented digitally after analog-digital coding of the reception signal. The transmission and reception modules are connected to a transmission and reception assembly 10' analogous to that in FIG. 1. In a configuration of the MIMO type as illustrated in FIG. 2, the transmission and the reception may be simultaneous.

A radar according to the invention comprises hardware and processing features.

As regards the hardware, a radar according to the invention is based on an active antenna using an ambiguous array, whose angular coverage is provided within a field $\Delta\theta$ by electronic scanning or MIMO processing notably exhibiting the following features:

The antennas used in transmission constitute an ambiguous array in at least one radiation plane, this array comprising a number $N_{TX}$ of elementary antennas with angular opening $\Delta\theta$, regularly spaced out by a distance $L_{TX}$, producing an ambiguous angular radiating pattern of angular periodicity in $\theta$ such that sin $\theta=\lambda/L_{TX}$, $\lambda$ being the wavelength of the radar;

There exists a number $N_{ambTX}$ of ambiguous transmission angular directions contained within the angular opening of the transmission elementary antenna, $N_{ambTX}$ being greater than or equal to 2;

The antennas used in reception constitute an array in the same radiation plane as the transmission array, this array comprising $N_{RX}$ elementary antennas of angular opening $\Delta\theta$, regularly spaced out by a distance $L_{RX}$, producing a potentially ambiguous angular radiating pattern of angular periodicity in $\theta$ such that sin $\theta=\lambda/L_{RX}$, $\lambda$ being the wavelength of the radar;

There exists a number $N_{ambRX}$ of ambiguous reception angular directions contained within the angular opening of the transmission elementary antenna, $N_{ambRX}$ being greater than or equal to 1;

The ambiguity periods $\lambda/L_{TX}$ and $\lambda/L_{RX}$, respectively of the transmission arrays, denoted TX, and of the reception arrays, denoted RX, are chosen to be different from one another, and in such a manner that for any given pair of orientation directions TX and RX, there is no more than one coincidence possible of the ambiguous directions TX and RX within the angular field $\Delta\theta$.

As regards the processing, the coverage of the angular field is subsequently obtained within the angular field $\Delta\theta$:

At the transmission, by moving by electronic scanning the main direction of the beam focused by all of the $N_{TX}$ transmission antennas within an angular field limited to the field of ambiguity defined by sin $\theta=\lambda/L_{TX}$ (electronic scanning is understood to mean any electronic means allowing focused beams to be formed from the antenna array such as switching, phase-shifting or MIMO processing, notably);

At the reception, for each orientation direction of the transmission, by beam formation by computation (BFC) using the signals collected on the $N_{RX}$ reception antennas, a set of beams is generated focused in the main direction and each of the ambiguous directions formed by the transmission array.

Advantageously, the radar is configured for this purpose. Advantageously, the electronic scanning method using the radar according to the invention implements the steps previously described implemented so as to cover the angular field.

Finally, the residues of angular ambiguities linked to the product of the ambiguous transmission and reception radiating patterns are eliminated by a Doppler processing allowing the directions of arrival of the echoes coming from the targets or from the fixed radar clutter to be separated.

The radar is advantageously configured for this purpose and the scanning method advantageously comprises this step.

The array thus formed allows a given angular field $\Delta\theta$ to be covered with a reduced number of antenna orientation control states at the transmission. Thus, for a given angular resolution $\Delta\theta r$, corresponding to the length of the antenna array L, such that $\Delta\theta r=(\lambda/N_{TX})\cdot LTX$, with a conventional angular scanning, a minimum number of antenna orientations would be needed at the transmission $Np=\Delta\theta/\Delta\theta r$ in order to cover the whole of the field $\Delta\theta$.

According to the invention, this number is reduced by a factor $N_{ambTX}$, corresponding to the number of ambiguous beams at the transmission contained in the opening $\Delta\theta$ of the elementary antenna.

Furthermore, at least two angular directions are observable simultaneously at reception for the same transmission orientation command. In the case of an electronic scanning, this allows the refreshment time to be decreased, which is able to compensate for a part of the losses of the antenna array due to the fact that it is a thinned array. In the case of MIMO processing, this allows the processing load to be reduced.

These hardware aspects and these processing operations according to the invention are now described, first of all with regard to a linear array (FIG. 3) then to a plane array (FIG. 11).

FIG. 3 shows, by way of example, a radar using a MIMO antenna composed of:

a row 31 of elementary transmission antennas, called TX antennas, comprising $N_{TX}=12$ elementary antennas 311 and;

a row 32 of elementary reception antennas, called RX antennas, comprising $N_{RX}=8$ elementary antennas 321.

In this example:

The antennas are all chosen to be identical and with an opening $\Delta\theta=12$;

The distance between two adjacent transmission antennas is given by $L_{TX}=10\lambda$, where $\lambda$ is the wavelength of the radar;

The distance between two adjacent reception antennas is given by $L_{RX}=15.7\lambda$.

Thus formed, when the transmission and reception orientations are aligned in the direction orthogonal to the antenna plane, taken as reference at $\theta=0°$, the arrays TX and RX each form focused and ambiguous radiating patterns, according to FIG. 4.

FIG. 4 shows the various antenna radiating patterns involved as a function of the angle $\theta$:

the radiating pattern of an elementary antenna represented by a first curve 41;

the transmission radiating pattern TX represented by a second curve 42, inscribed within the antenna radiating pattern 41 and;

the reception radiating pattern RX represented by a third curve 43, also inscribed within the antenna radiating pattern 41.

The angular opening 44 of an elementary antenna at 3 dB surrounding the reference 0° is also shown, here included between −5.7° and +5.7°. Within this antenna angular opening, there are:

three ambiguous directions in transmission, in the directions −5.7°, 0° and +5.7°, and;

three ambiguous angular directions in reception, −3.7°, 0° and +3.7;

the radiating patterns for transmission 42 and for reception 43 being coincident in the direction 0°.

The product of the transmission radiating pattern 42 and of the reception radiating pattern 43, in this configuration, exhibits an unambiguous single lobe, in the direction 0°, according to the representation in FIG. 5, the unambiguous single lobe 51 being shown with respect to the square of the elementary antenna radiating pattern 52.

It is recalled here that, for the transmission, the beam is oriented in a direction given according to a phase law, in a known manner, whereas for the reception a digital processing operation is carried out. The digital processing in reception is also well known and corresponds to a complex weighting of phases where a numerical sum of the received signals is carried out, each received signal being assigned a phase. The weighting determines the orientation of the beam in reception, 0° for example in the case of FIG. 4.

The radiating pattern resulting from the product of the transmission and reception radiating patterns exhibits a main lobe corresponding to the coincidence of the transmission radiating pattern and of the reception radiating pattern, whose respective orientations are obtained as described hereinabove. The product illustrated in FIG. 5 gives the unambiguous main lobe 51 oriented at 0°, in view of the orientations of the transmission and reception beams. The following figures show other products giving other unambiguous lobes.

FIG. 6A shows the result of the product of the transmission and reception radiating patterns when the transmission array TX is oriented in the direction 0° and the array RX is oriented in the direction −2°. This configuration is obtained:

by maintaining the orientation direction at the transmission in the direction 0°, according to FIG. 4;

and by applying an orientation direction of −2° in reception, by notably adjusting the weighting of the received signals.

FIG. 6B shows the result of the product of the transmission and reception radiating patterns when the transmission array TX is oriented in the direction 0° and the array RX is oriented in the direction +2°. This configuration is obtained:

by maintaining the orientation direction at the transmission in the direction 0°;

and by applying an orientation direction of 2° in reception.

In both cases, by the product of the transmission and reception radiating patterns, a radiating pattern is obtained comprising a main lobe 61, 62 in the direction of coincidence of the transmission and reception array functions respectively at −5.6° and +5.6° and a residual secondary lobe 63, 64 in the opposite direction, with a lower level. The main lobes 61, 62 are limited by the square of the antenna radiating pattern 60.

Thus, for the same orientation direction in transmission, it is possible to simultaneously form reception beams 51, 61, 62 in three different directions, potentially with residual ambiguous lobes 63, 64. These beams may be formed simultaneously because, as has previously been recalled, the beams in reception are formed by computation and, for the same orientation direction of the transmission beam, may be calculated in parallel (hence simultaneously). In the exemplary application in FIGS. 3 and 4, a cycle gain of a factor 3 is advantageously obtained corresponding to the number of ambiguous angular directions within the angular opening 44, in this example $N_{ambTX}=3$.

Other orientation solutions for transmission and for reception TX/RX are illustrated in FIGS. 7 to 10, corresponding to the extreme disalignment of the transmission array, in other words at the limit of the field of ambiguity. In these examples, this field coincides with the angular opening, but this is not always the case in practice. As for the preceding example, the transmission and reception antenna elements are disposed in such a manner that the product of the transmission and reception radiating patterns only produces a single main beam within the field defined by the opening of an elementary antenna.

FIG. 7 therefore shows the transmission radiating pattern oriented in the direction +5.7°, represented by the curve 42', and whose lobe directions are offset by +5.7° with respect to the lobes of the curve 42 in FIG. 4. In this configuration, the reception radiating pattern, represented by a curve 43', is also oriented in the direction +5.7°, the transmission and reception radiating patterns coinciding in this direction.

Figure 8:
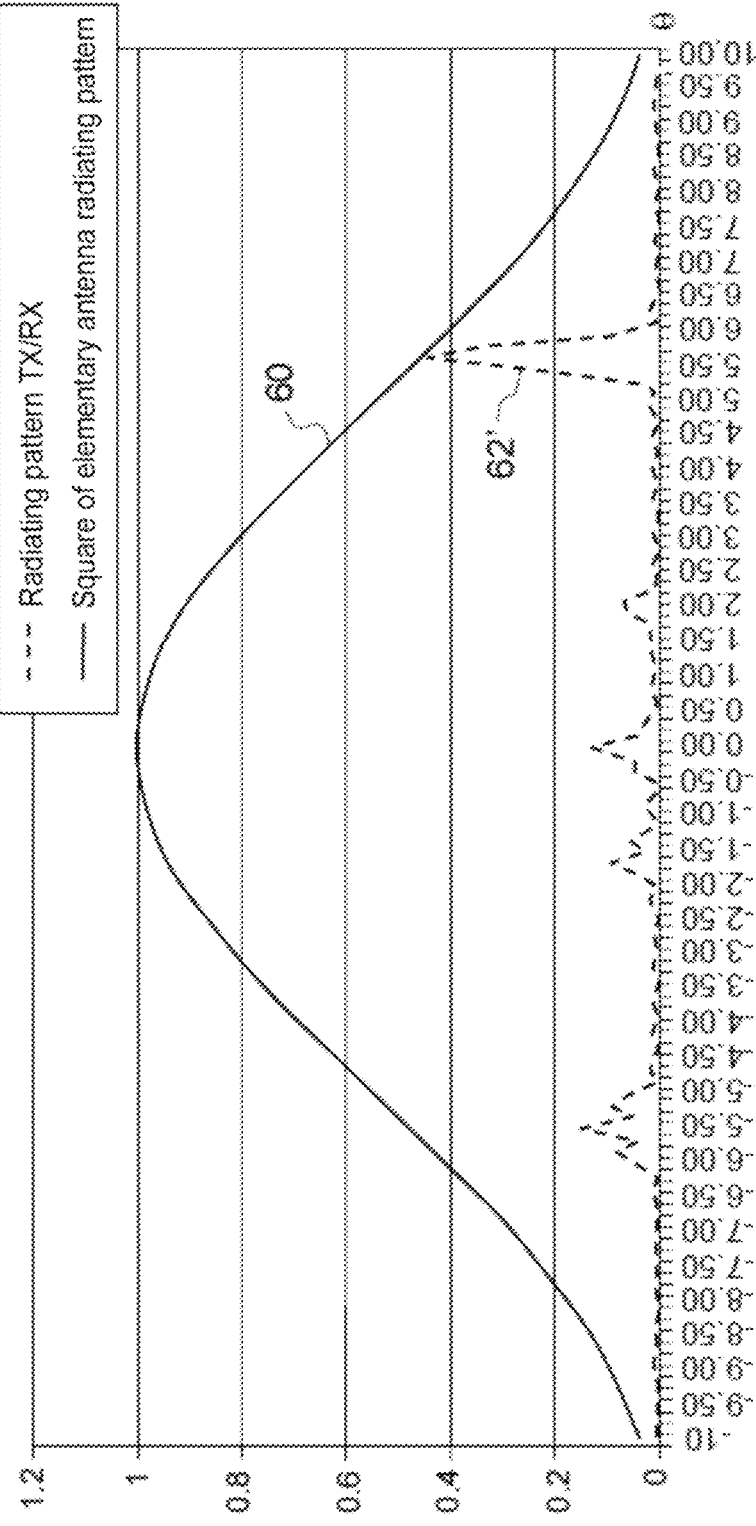
FIG. 8 illustrates with a single lobe 62' the result of the product of the transmission and reception radiating patterns when the radiating patterns for transmission TX and for reception RX are oriented in the direction +5.7°.
Figure 9:
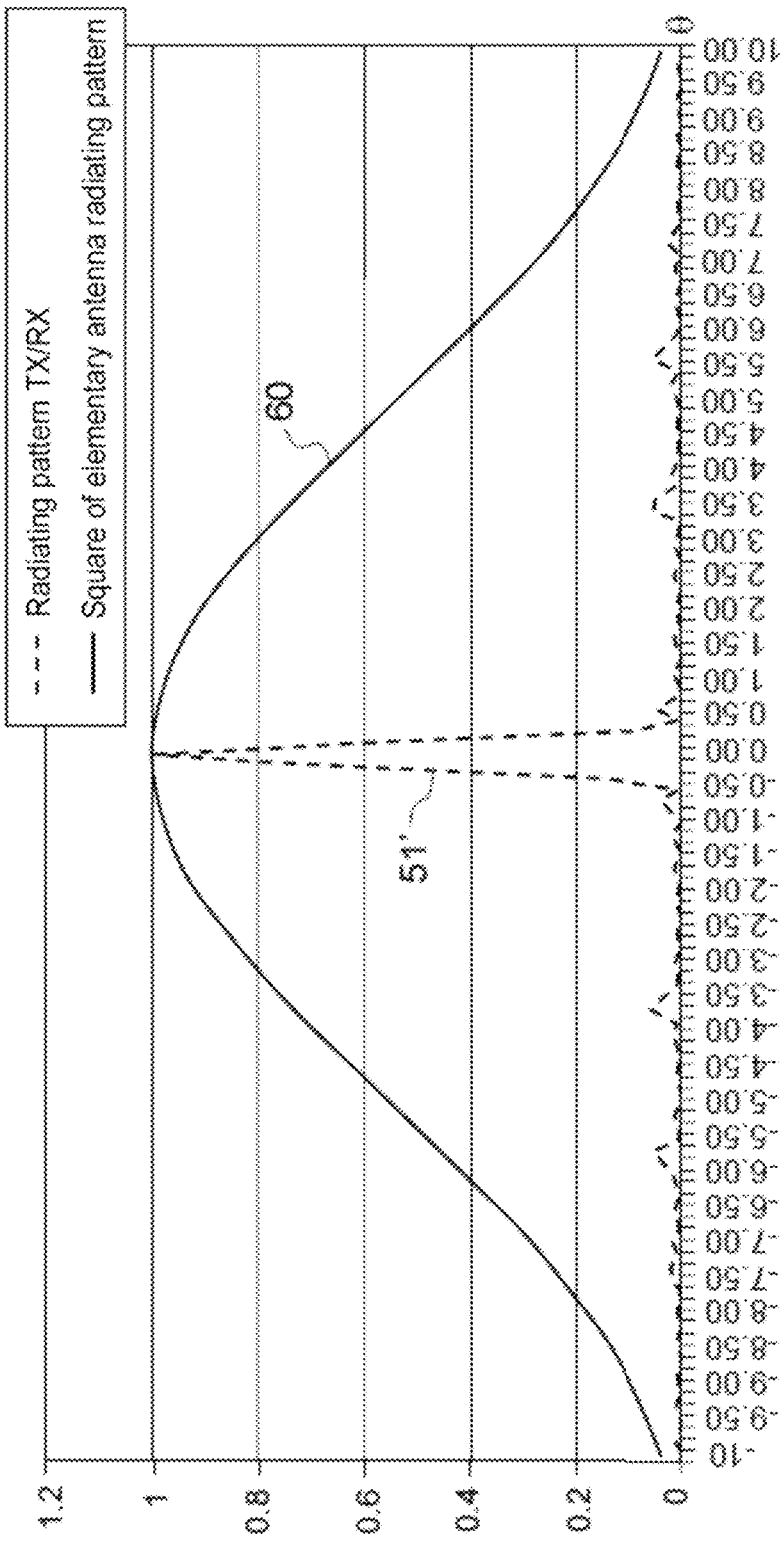
FIG. 9 illustrates with a single lobe 51' the result of the product of the transmission and reception radiating patterns when the transmission radiating pattern TX is oriented in the direction +5.7° and the reception radiating pattern RX is oriented in the direction 0°.
Figure 10:
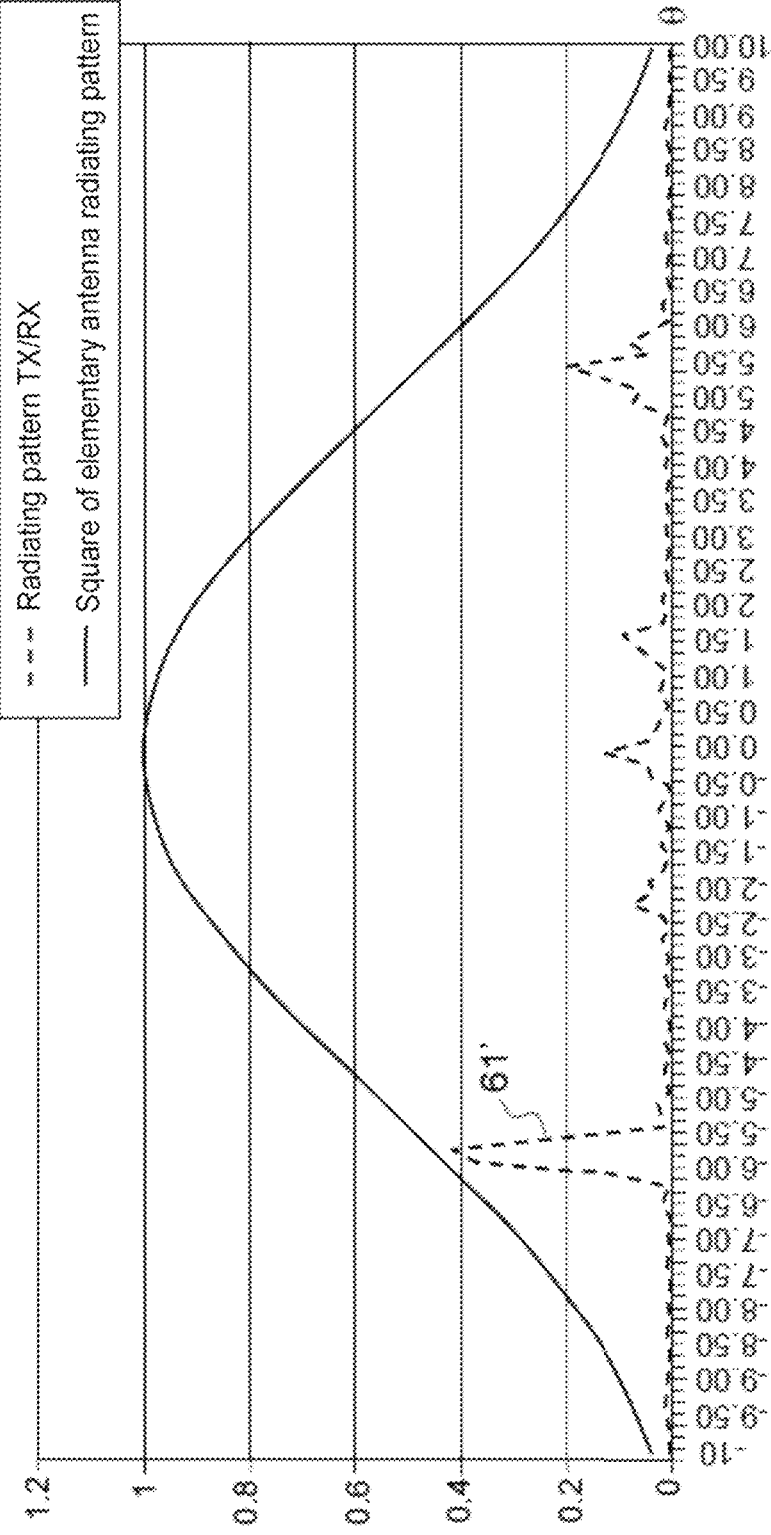

FIG. 10 illustrates, with a single lobe 61', the result of the product of the transmission and reception radiating patterns when the transmission radiating pattern TX is oriented in the direction +5.7° and the reception radiating pattern of reception RX is oriented in the direction −5.7°. In these three products, illustrated in FIGS. 8, 9 and 10, residual lobes are added to the main lobe 51', 61', 62', with a lower level. The following part of the description will show how these residual lobes may be filtered.

Each configuration of transmission orientation TX intermediate between the direction 0° and the direction corresponding to the limit of the field of ambiguity TX, in the same way, allows three main beams to be generated by multiplication of the array radiating patterns TX and RX, with residual lobes that are larger or smaller depending on the combination of orientation TX with respect to RX. In the present example, three beams are generated starting from the three ambiguous transmission beams; a different number of beams may of course be generated depending on the number $N_{ambTX}$ of ambiguous beams comprised within the antenna opening.

These principles may be applied to a two-dimensional array antenna, comprising several transmission lines and several reception lines.

Figure 11:
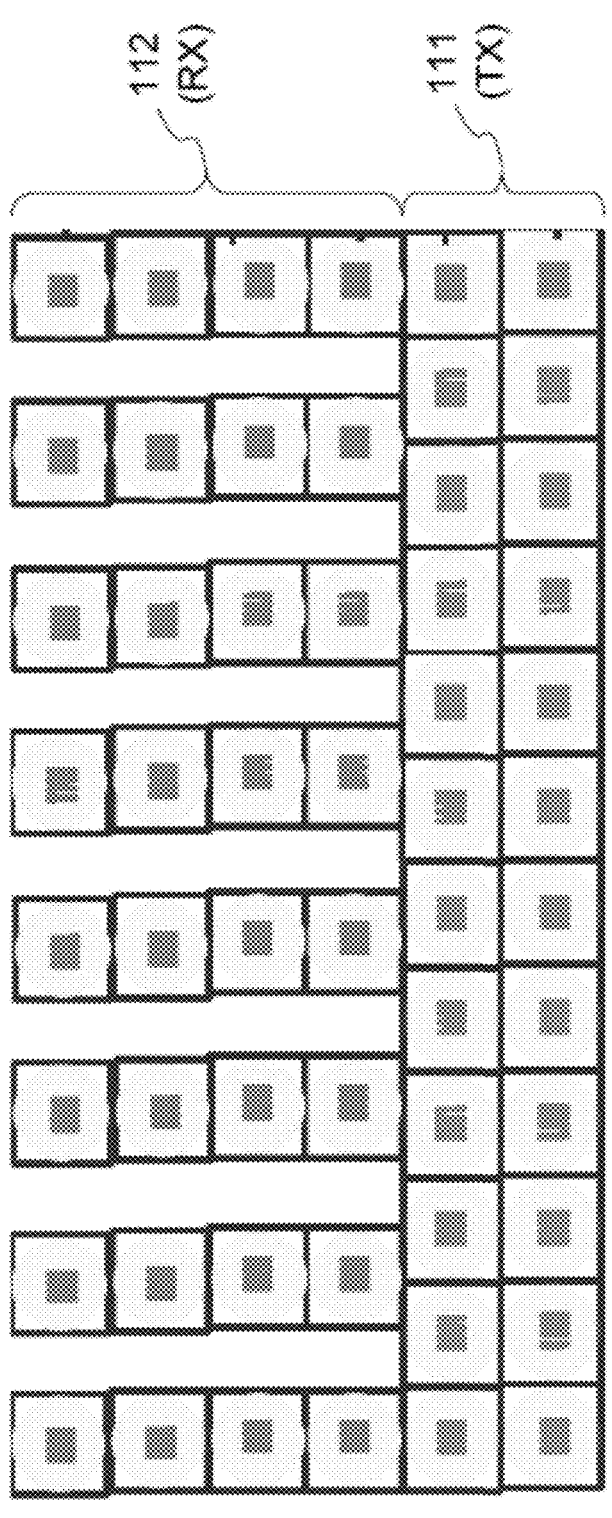

FIG. 11 shows one example of such a two-dimensional array antenna, comprising:

two transmission lines 111 each comprising 12 elementary antennas and;

four reception lines 112 each comprising 8 elementary antennas.

In particular, in one application of the EVS type, ambiguous antenna arrays may be used once in azimuth and in elevation, and the same methods applied in the two planes, which decreases even more the number of beams to be formed at the transmission.

In order to reduce the residual ambiguity lobes obtained by transmission beam TX formation and by reception beam RX formation, the radar according to the invention uses Doppler processing, for example by integrating the received signals from recurrence to recurrence by numerical Fourier transform according to the methods known to those skilled in the art.

Indeed, on a carrier moving at the speed Vp, the Doppler frequencies Fd corresponding to the fixed echoes are different depending on the directions of arrival with respect to the path of the carrier, according to the relationship $$Fd = \frac{2Vp}{\lambda}\cos\Theta,$$

where θ is the angle between the direction of movement of the carrier and the direction of arrival of the fixed echoes.

The variation of the Doppler frequency as a function of the angle θ is given by:

$$\frac{\delta Fd}{\delta\Theta} = \frac{2Vp}{\lambda}\sin\Theta \cong \frac{2Vp}{\lambda}\Theta$$

for small angles, where θ is expressed in radians.

According to the invention, this property is exploited in order to reduce the residual ambiguous lobes by virtue of Doppler filtering. In particular, for a radar operating in the millimeter wave range, the Doppler frequencies are high and the angular separation by the Doppler technique is possible, even for low angles.

For example, considering a carrier moving at a speed Vp equal to 60 m/s and a wavelength λ of 3 cm, we obtain:

$$\frac{\delta Fd}{\delta\Theta} = 4000\,\Theta.$$

An angular variation of 1°, i.e. 17 mrd, then produces a variation in Doppler frequency at small angles of the order of 70 Hz.

Thus, in a typical configuration where the Doppler integration time is of the order of Ti=50 ms, the Doppler resolution of the radar is: ΔFd=1/Ti=20 Hz, and two echoes angularly separated by 1° are separable.

The elimination of the ambiguity lobe residues is obtained by selecting as useful signal the output of the Doppler filter corresponding to the direction of the main beam resulting from the product of the radiating patterns for transmission TX and for reception RX. This requires the knowledge of the speed Vp of the carrier and of the boresight direction of the antenna. The speed Vp of the carrier may be estimated by an inertial navigation system or by the radar itself, for example according to the principles described in the patent application FR2004262. The boresight direction of the antenna is furthermore known, the radar being rigidly attached to the carrier. The field of the signals retained as useful may be extended as needed to a few filters around the direction of the main beam, depending on the uncertainties in the estimations.

Lastly, in the case of an airborne radar providing the EVS function using an ambiguous array in elevation, the rejection of the residues of the ambiguity lobes in elevation may be further reinforced by virtue of the selectivity in distance of the radar, the glide slope of the aircraft α, typically 3°, the altitude H and the tilt of the antenna being known. The tilt of the antenna being the orientation of the antenna beam with respect to the horizontal, in this context it is accordingly deduced at which distance the beam will reach the ground, the undesirable distances corresponding to undesirable angles. These angles, and hence the corresponding directions, may then be filtered.

The altitude of the carrier may be estimated for example by the onboard altimeter, or by the radar itself using the return of the ground echoes according to the methods known to those skilled in the art. The distance from a point on the ground corresponds to an angle of elevation $\theta_{el}$ with respect to the horizontal, where $\theta_{el}$=arctan(D/H), D being the distance estimated by the radar. It is possible to establish an estimation of $\theta_{el}$ by the estimation of the distance of the point targeted and of the altitude of the aircraft. Depending on the distance slot processed by the radar, only the detections whose elevation angular measurements are close to the primary estimation of $\theta_{el}$ are validated.

The preceding examples show that, by advantageously exploiting the ambiguities of an antenna array, a radar system according to the invention can cover a given angular field Δθ with a reduced number of antenna orientation control states at the transmission. Thus, for a given angular resolution Δθr, corresponding to the length of the antenna array L, such that $\Delta\theta r = (\lambda/N_{TX})\cdot LTX$, with a conventional angular scanning, a minimum number of antenna orientations at the transmission $Np=\Delta\theta/\Delta\theta r$ would be required in order to cover the whole of the field $\Delta\theta$.

Figure 1:
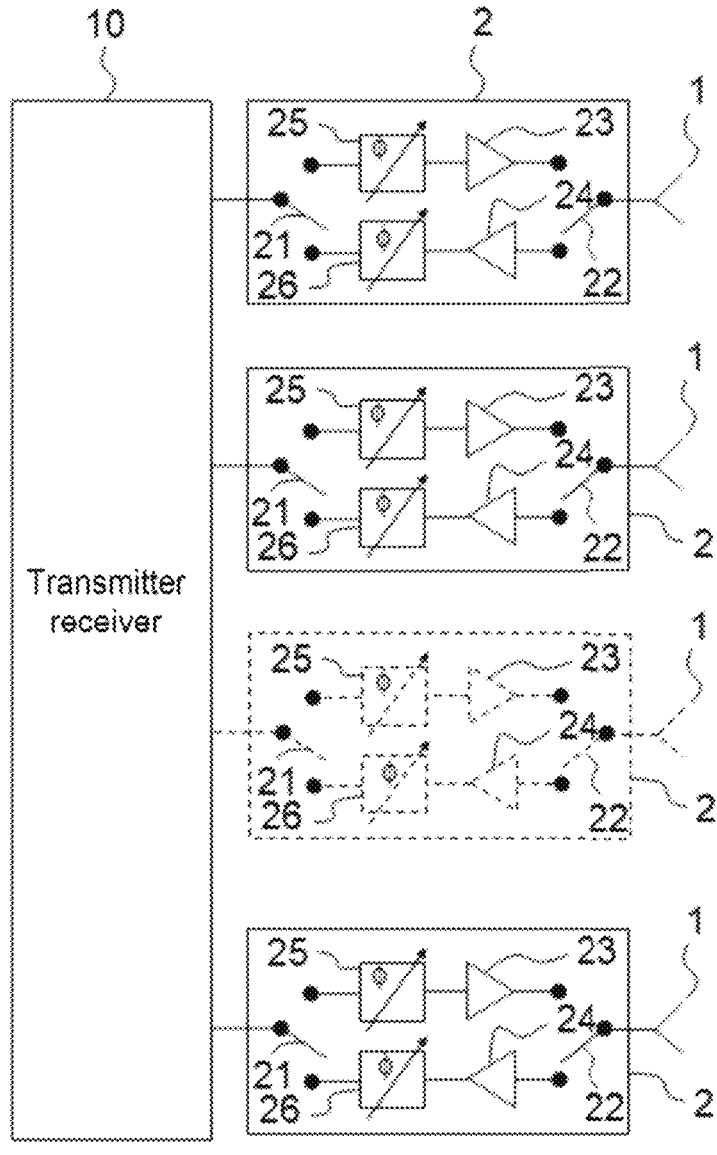
Figure 2:
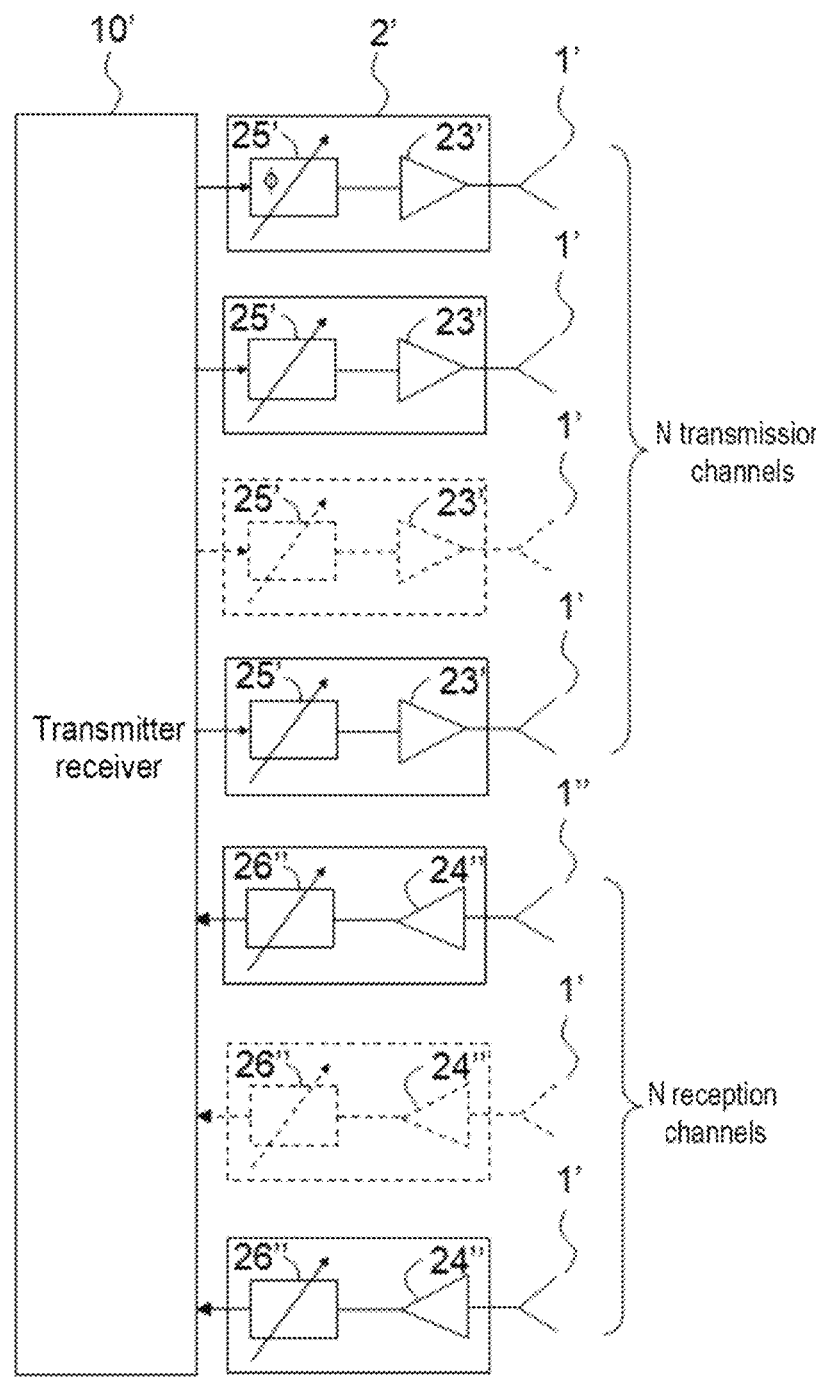
Figure 3:
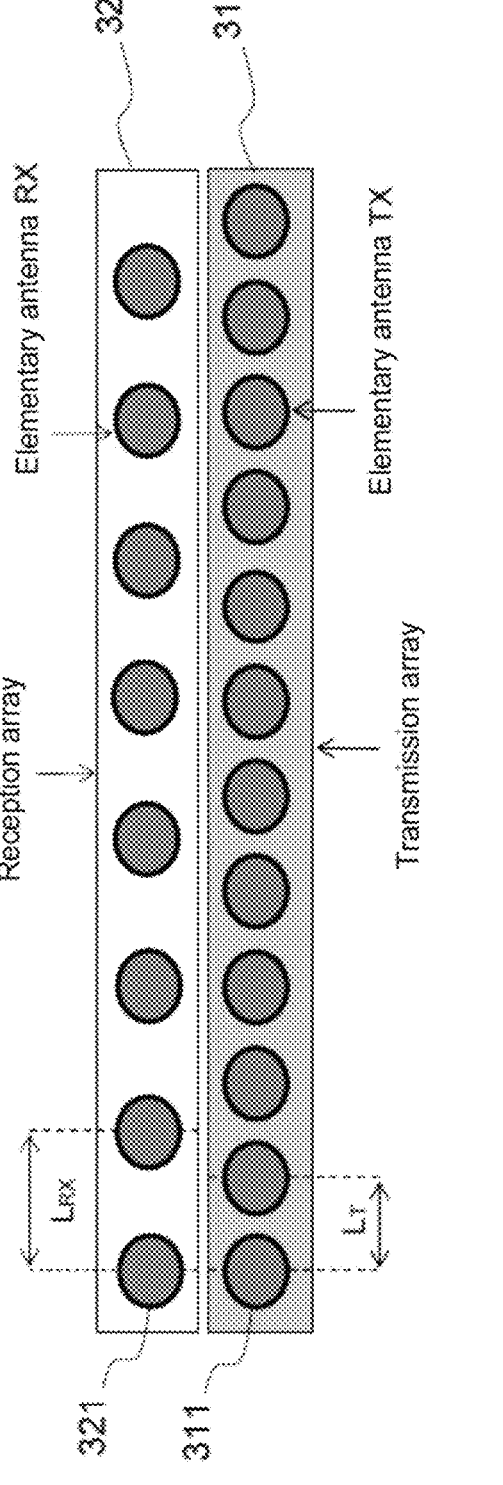
Figure 4:
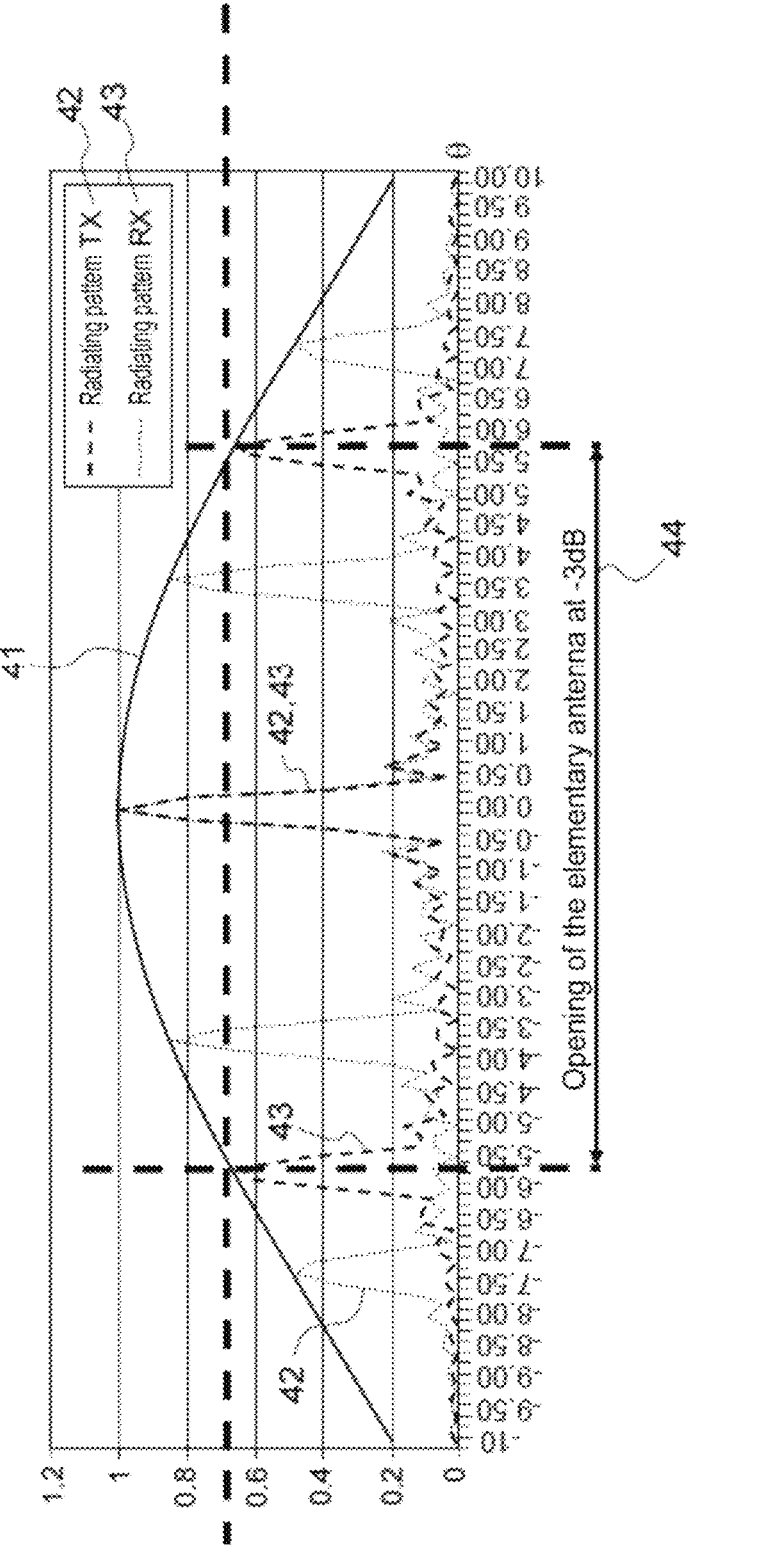
Figure 5:
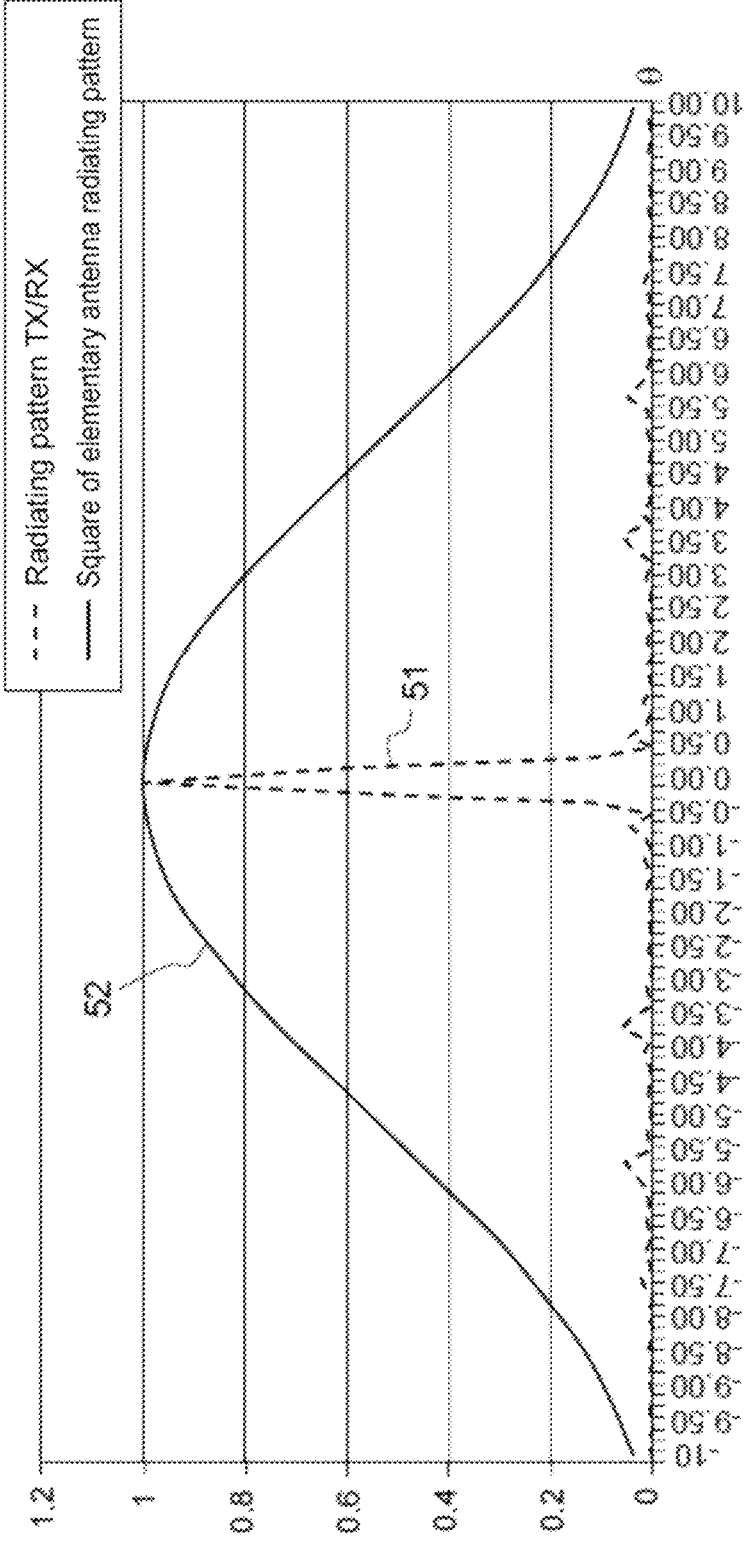

For a radar system according to the invention, this number is reduced by a factor $N_{ambTX}$, corresponding to the number of ambiguous beams at the transmission contained within the opening $\Delta\theta$ of the elementary antenna. Referring to the example in FIG. 3, with the ambiguities illustrated in FIG. 4, $N_{ambTX}=3$.

Figure 6A:
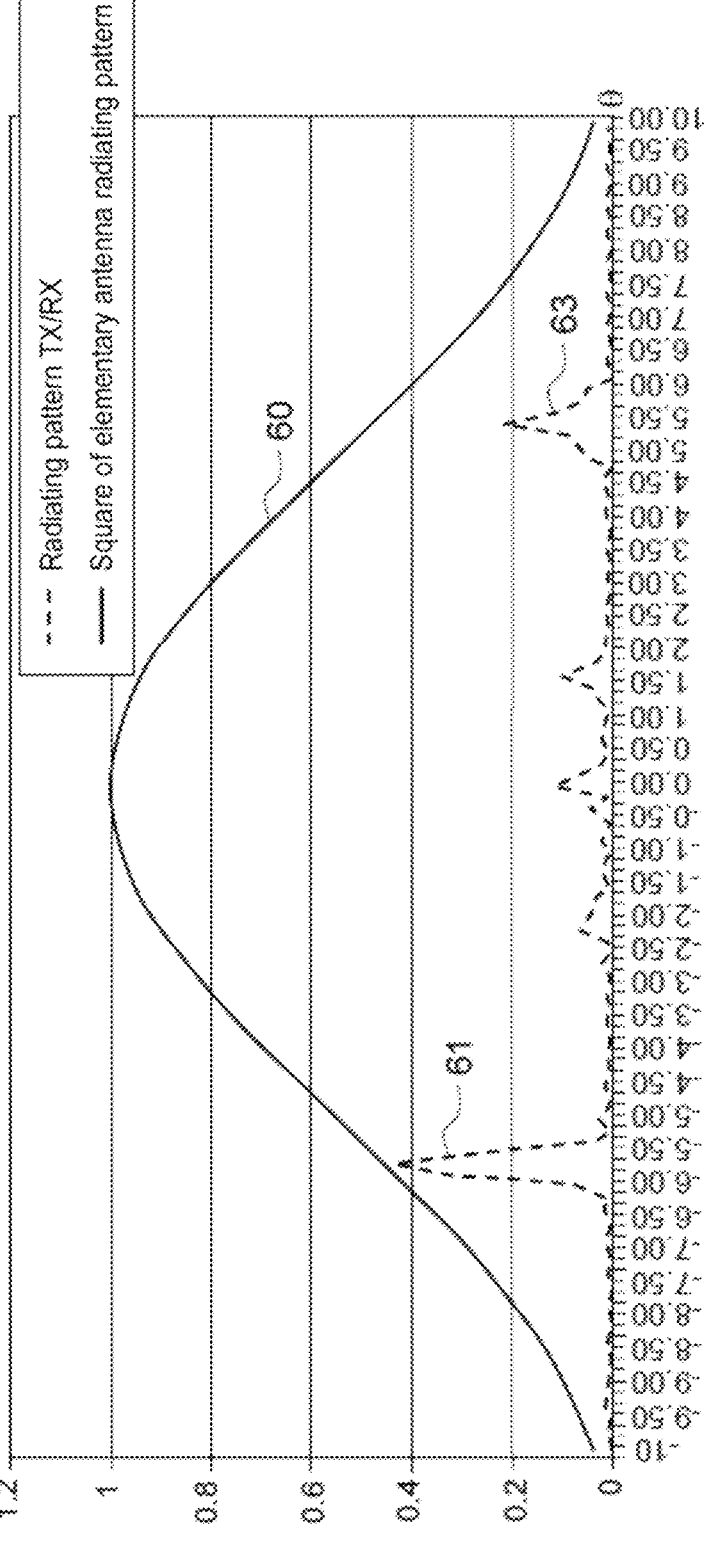
Figure 6B:
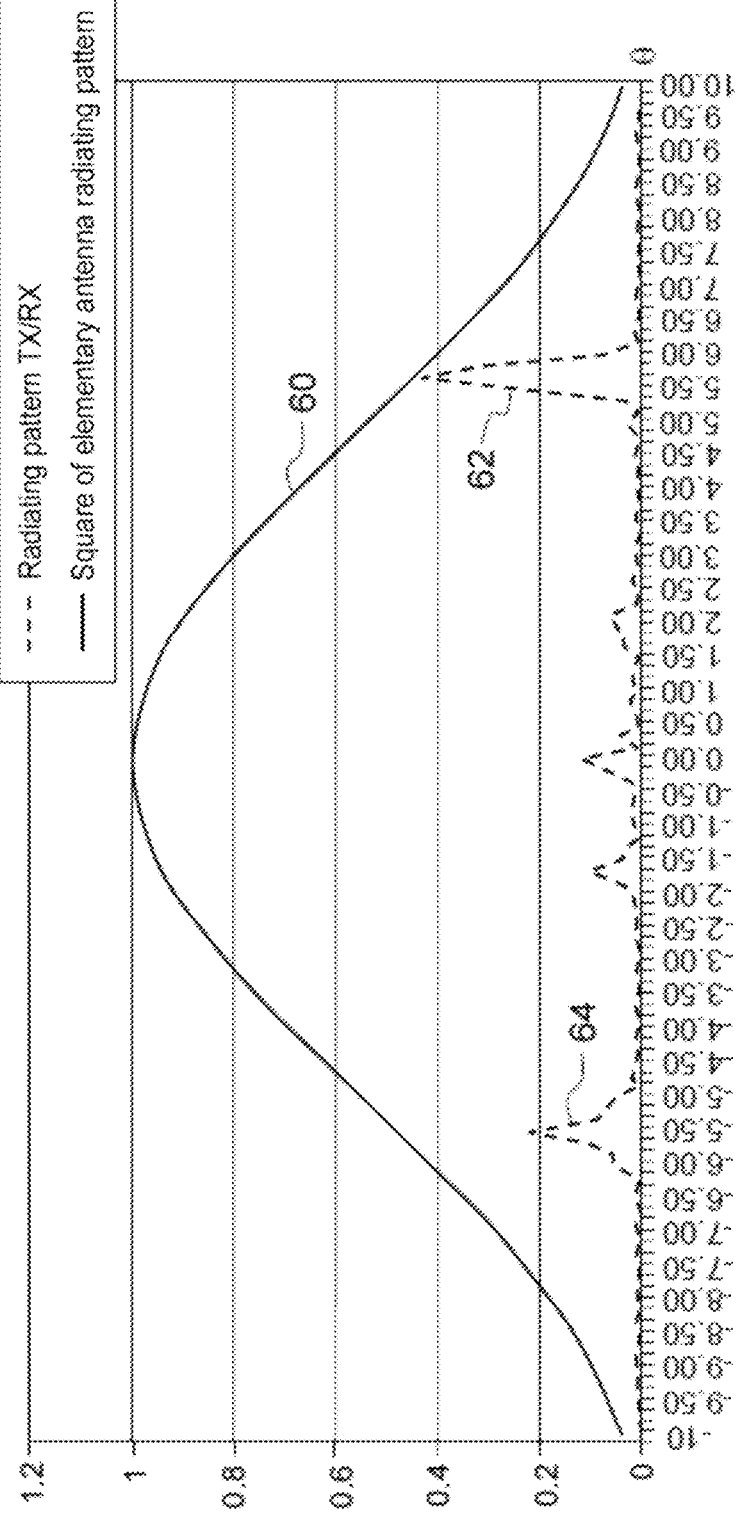
Figure 7:
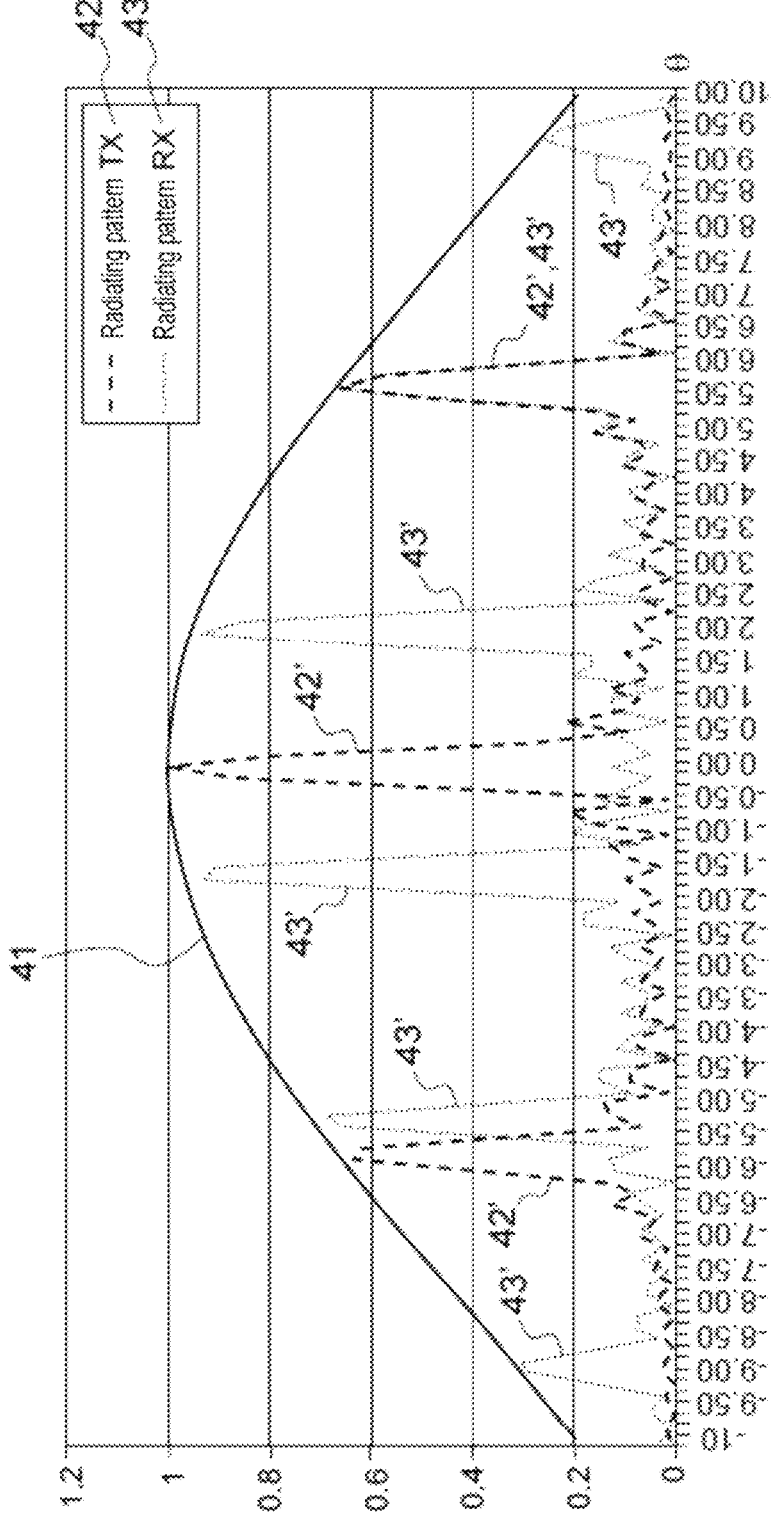

Furthermore, at least two angular directions are observable simultaneously in reception for the same transmission orientation control, as is illustrated for example in FIGS. 6A and 6B with the orientation directions 61, 62. In the case of an electronic scanning, this allows the refreshment time to be decreased, which is able to compensate for a part of the losses due to the fact that it is a thinned array. In the case of MIMO processing, this also allows the processing load to be reduced.

The invention claimed is:

1. A radar with ambiguous electronic scanning designed to cover a given angular field, the radar with ambiguous electronic scanning comprising an active antenna comprising an array of elementary transmission antennas and an array of elementary reception antennas with a same angular opening, said transmission and reception arrays having a same radiation plane, characterized in that:

said transmission array is ambiguous with a number $N_{ambTx}$ of ambiguous lobes within said angular opening, $N_{ambTx}$ being greater than or equal to 2, producing a transmission radiating pattern;

said reception array comprises at least one ambiguous lobe within said angular opening, producing a reception radiating pattern, said transmission and reception arrays being arranged so that the product of the transmission and reception radiating patterns only produces a single main beam within the field defined by said angular opening;

wherein:

said transmission array comprises a number NTX of elementary antennas of angular opening $\Delta\theta$, regularly spaced out by a distance LTX, producing an ambiguous angular radiating pattern of angular periodicity in $\theta$ such that $\sin\theta$ is equal to $\lambda/LTX$, $\lambda$ being the wavelength of said radar;

said reception array comprises a number NRX of elementary antennas of angular opening $\Delta\theta$, regularly spaced out by a distance LRX, producing a potentially ambiguous angular radiating pattern of angular periodicity in $\theta$ such that $\sin\theta$ is equal to $\lambda/LRX$;

the ambiguity periods of the transmission and reception arrays, respectively, being chosen to be different from one another, and in such a manner that, for any given pair of transmission and reception orientation directions, there is no more than one possible coincidence of ambiguous transmission and reception directions within said angular opening;

said radar being configured for covering the given angular field:

by moving by electronic scanning the main direction of a beam focused by all of the NTX transmission antennas within a field of ambiguity defined by $\sin\theta=\lambda/LTX$;

for each orientation direction of a transmission, using beam formation by computation based on the signals collected on the NRX reception antennas, by generating a set of beams focused in the main direction and each of the ambiguous directions formed by the transmission array.

2. The radar as claimed in claim 1, configured for covering the given angular field:

by forming transmission radiating patterns that are focused within a field limited to a transmission ambiguity field, by simultaneously forming several transmission radiating patterns focused at reception in ambiguous transmission directions.

3. The radar as claimed in claim 1, characterized in that residual ambiguity lobes are rejected by Doppler filtering.

4. The radar as claimed in claim 1, characterized in that residual ambiguity lobes are rejected by selectivity in distance.

5. The radar as claimed in claim 1, characterized in that said active antenna is of a type active array with electronic scanning.

6. The radar as claimed in claim 1, characterized in that said active antenna is of a type with multiple inputs and outputs.

7. A method of electronic scanning of a given angular field using a radar with ambiguous electronic scanning designed to cover a given angular field, the radar with ambiguous electronic scanning comprising an active antenna comprising an array of elementary transmission antennas and an array of elementary reception antennas with a same angular opening, said transmission and reception arrays having a same radiation plane, wherein:

said transmission array is ambiguous with a number $N_{ambTx}$ of ambiguous lobes within said angular opening, $N_{ambTx}$ being greater than or equal to 2, producing a transmission radiating pattern;

said reception array comprises at least one ambiguous lobe within said angular opening, producing a reception radiating pattern, said transmission and reception arrays being arranged so that the product of the transmission and reception radiating patterns only produces a single main beam within the field defined by said angular opening;

wherein the given angular field is covered:

by forming transmission radiating patterns that are focused within a field limited to a transmission ambiguity field, by simultaneously forming several reception radiating patterns focused at reception in ambiguous transmission directions;

wherein:

said transmission array comprises a number NTX of elementary antennas of angular opening $\Delta\theta$, regularly spaced out by a distance LTX, producing an ambiguous angular radiating pattern of angular periodicity in $\theta$ such that $\sin\theta$ is equal to $\lambda/LTX$, A being the wavelength of said radar;

said reception array comprises a number NRX of elementary antennas of angular opening $\Delta\theta$, regularly spaced out by a distance LRX, producing a potentially ambiguous angular radiating pattern of angular periodicity in $\theta$ such that $\sin\theta$ is equal to $\lambda/LRX$;

the ambiguity periods of the transmission and reception arrays, respectively, being chosen to be different from one another, and in such a manner that for any given pair of transmission and reception orientation directions, there is no more than one possible coincidence of ambiguous transmission and reception directions within said angular opening;

and wherein the given angular field is covered:

by moving by electronic scanning the main direction of a beam focused by all of the NTX transmission antennas within a field of ambiguity defined by sin $\theta=\lambda/LTX$;

for each orientation direction of a transmission, using beam formation by computation based on the signals collected on the NRX reception antennas, by generating a set of beams focused in the main direction and each of the ambiguous directions formed by the transmission array.

8. The scanning method as claimed in claim 7, wherein residual ambiguity lobes are rejected by Doppler filtering.

9. The radar as claimed in claim 7, characterized in that residual ambiguity lobes are rejected by selectivity in distance.

* * * * *